US009518673B2

(12) United States Patent
Tanikawa et al.

(10) Patent No.: US 9,518,673 B2
(45) Date of Patent: Dec. 13, 2016

(54) MANUAL AND PRESSURIZED FLUID CONTROLLED FLUID CONTROLLER

(71) Applicant: FUJIKIN INCORPORATED, Osaka-shi (JP)

(72) Inventors: Tsuyoshi Tanikawa, Osaka (JP); Tadayuki Yakushijin, Osaka (JP); Keisuke Ishibashi, Osaka (JP); Yasumasa Yanagida, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 0 days.

(21) Appl. No.: 14/740,854

(22) Filed: Jun. 16, 2015

(65) Prior Publication Data
US 2015/0369370 A1  Dec. 24, 2015

(30) Foreign Application Priority Data

Jun. 19, 2014 (JP) ................................. 2014-126433

(51) Int. Cl.
| | | |
|---|---|---|
| *F16K 31/122* | (2006.01) | |
| *F16K 31/50* | (2006.01) | |
| *F16K 7/16* | (2006.01) | |
| *F16K 7/17* | (2006.01) | |

(52) U.S. Cl.
CPC ............. *F16K 31/1225* (2013.01); *F16K 7/16* (2013.01); *F16K 7/17* (2013.01); *F16K 31/508* (2013.01)

(58) Field of Classification Search
CPC .......... F16K 1/02; F16K 31/50; F16K 31/122; F16K 17/06; F16K 51/02
USPC ........................................................... 251/14
See application file for complete search history.

(56) References Cited

U.S. PATENT DOCUMENTS

2011/0073197 A1*  3/2011  Hirose ................ F16K 31/1221
                                                                  137/488

FOREIGN PATENT DOCUMENTS

JP        2005-090737 A      4/2005

* cited by examiner

*Primary Examiner* — Marina Tietjen
*Assistant Examiner* — Daphne M Barry
(74) *Attorney, Agent, or Firm* — Locke Lord LLP

(57) ABSTRACT

A fluid controller includes an automatic opening-and-closing device configured to move a valve rod upward and downward, and a manual opening-and-closing device configured to move the valve rod upward and downward by a manual operation. The manual opening-and-closing device includes a cylindrical handle supported by a casing so as to be rotatable and not to move upward and downward, and a cylindrical operating member screwed into a female screw of the handle and configured to move upward and downward with a rotation of the handle. The operating member is apart from a piston of the automatic opening-and-closing device in a vertical direction in an automatic operation. The piston is moved by the operating member which moves upward in association with the rotating operation of the handle in a manual operation in an opposite direction from the opening state brought by the automatic opening-and-closing device.

4 Claims, 8 Drawing Sheets

MANUAL AND PRESSURIZED FLUID CONTROLLED FLUID CONTROLLER

BACKGROUND OF THE INVENTION

1. Field of the Invention

The present invention relates to a fluid controller and, specifically, to a fluid controller capable of opening and closing both automatically and manually.

2. Description of the Related Art

Known examples of the fluid controller capable of opening and closing both automatically and manually include a configuration including a valve box provided with a fluid passage, a valve element configured to open and close the fluid passage, a casing provided on an upper portion of the valve box, a valve rod configured to move the valve element in an opening or closing direction by moving upward or downward, and a piston configured to form a compressed fluid introducing chamber between the piston and the casing, and being provided with an automatic opening-and-closing device configured to move the valve rod by a compressed fluid, and a manual opening-and-closing device configured to move the valve rod by a manual operation (JP-A-2005-90737).

The fluid controller disclosed in JP-A-2005-90737 has a general automatic valve configuration and a handle of a manual operation and, in addition, includes components such as a rod-shaped member as an operating member at the time of automatic opening and closing operation, a compressed coil spring as a resilient member for biasing the rod-shaped member, a cylindrical member as an operating member to be operated at the time of manual opening and closing operation, a movable passage member, a compressed coil spring as a resilient member for biasing the movable passage member.

The fluid controller of the related art includes many components, and hence has a complex configuration disadvantageously.

SUMMARY OF THE INVENTION

It is an object of the invention to provide a fluid controller capable of performing both of an automatic opening and closing operation and a manual opening and closing operation, and having a simplified configuration.

A fluid controller of the invention includes a valve box provided with a fluid passage, a valve element configured to open and close the fluid passage, a casing provided on an upper portion of the valve box, a valve rod configured to move the valve element in an opening or closing direction by moving upward or downward, an automatic opening-and-closing device having a piston configured to form a compressed fluid introducing chamber between the piston and the casing and configured to move the valve rod by a compressed fluid, and a manual opening-and-closing device configured to move the valve rod by a manual operation, wherein the manual opening-and-closing device includes: a cylindrical handle supported by the casing so as to be capable of rotating and restricted from moving upward and downward, and a cylindrical operating member screwed into a female screw provided on an inner periphery of the handle and configured to move upward and downward in association with a rotating operation of the handle, the operating member is at a position apart from the piston of the automatic opening-and-closing device in a vertical direction at the time of automatic opening and closing operation, and the piston is moved by the operating member which moves upward and downward in association with the rotating operation of the handle at the time of manual opening and closing operation in an opposite direction from the normal opened or closed condition brought by the automatic opening-and-closing device.

The fluid controller has a configuration of a general automatic valve. Namely the fluid controller includes: the valve box provided with the fluid passage, the valve element configured to open and close the fluid passage, the casing provided on the upper portion of the valve box, the valve rod configured to move the valve element in the opening or closing direction by moving upward or downward, and an automatic opening-and-closing device having a piston configured to form a compressed fluid introducing chamber between the piston and the casing and configured to move the valve rod by a compressed fluid. And the fluid controller is additionally provided with the manual opening-and-closing device configured to move the valve rod upward and downward by the manual operation. Accordingly, the fluid controller capable of opening and closing both automatically and manually is obtained.

The automatic opening-and-closing device may be a normally-opened type configured to bias the piston with a biasing member in a direction to keep the passage to a normally-opened position and move the piston in a direction to close the passage with the compressed fluid, or may be a normally-closed type configured to bias the piston with the biasing member in a direction to keep the passage to be normally-closed position and move the piston in a direction to open the passage with the compressed fluid.

The manual opening-and-closing device moves the operating member upward and downward in association with the rotating operation of the handle. The manual opening-and-closing device may move the piston downward by the operating member to achieve a passage-closed state, and may move the piston upward by the operating member to achieve a passage-open state. In both types, the operating member is at a position apart from the piston of the automatic opening-and-closing device in the vertical direction at the time of automatic opening and closing operation, and the piston is moved by the operating member which moves upward and downward in association with the rotating operation of the handle at the time of manual opening and closing operation in the opposite direction from the normal opened or closed condition brought by the automatic opening-and-closing device.

By rotating the handle manually in this manner, the operating member moves upward and downward, and forces the piston as a component of the automatic opening-and-closing device to move via the operating member, so that an opposite state from the normal opened or closed condition brought by the automatic opening-and-closing device is achieved. Here, the manual opening-and-closing device needs only to include the handle, the operating member, and a supporting member (bolt or the like) configured to support these members, and members such as a compressed coil spring is not necessary. Therefore, the number of members may be reduced significantly in comparison with a type of the related art using members such as the compress coil spring.

In this specification, the terms "upper" and "lower" mean an upper side and a lower side of FIG. 1 and FIG. 6 (the valve box side of the fluid controller corresponds to the lower side, and the handle side corresponds to the upper side). However, the expressions of the upper and lower sides are used only for the sake of convenience and inverted usage or laterally reversed usage is also possible.

In order to make the handle supported by the casing so as to be rotatable and be restricted from moving upward and downward and make the operating member to move upward and downward in association with the rotation of the handle, for example, a lower portion of the handle is fitted to an inner periphery of an upper end portion of the casing, an annular groove is formed on an outer periphery of a portion of the handle fitted to the casing, a plurality of first supporting members are mounted on the casing so as to face the annular groove from radially outside, and radially inner end portions of the first supporting members are inserted into the annular groove, so that the handle is supported by the casing so as to be rotatable and to be restricted from moving upward and downward. In contrast, second supporting members extending radially outward are mounted on the operating member, the casing is provided with through holes which allow insertion of radially outside end portions of the second supporting members, and the through hole is an elongated hole elongated in the vertical direction, so that the operating member is supported by the casing so as to be restricted from rotating and to be movable upward and downward.

As the first supporting members and the second supporting members, for example, screws available in the market, or screws and pins which are machined to required shapes may be used.

As an example of the normally-opened type, there is a configuration in which a compressed fluid introducing chamber is formed above the piston, an inner periphery of the operating member corresponds to a compressed fluid passage, a lower end of the operating member may be positioned above an upper surface of the piston at the time of automatic opening and closing operation.

As an example of the normally-closed type, there is a configuration in which the compressed fluid introducing chamber is formed below the piston, the inner periphery of the operating member corresponds to the compressed fluid passage, an upper portion of the piston is slidably inserted into a lower portion of the operating member, projecting portions projecting radially inward are formed on an inner periphery of the lower portion of the operating member, and the piston is provided with an engaging portion which engages the projecting portions of the operating member when the operating member moves upward.

Also, as an example of the normally-closed type, there is a configuration in which the piston includes a large diameter portion configured to slide along an inner periphery of the casing, a small diameter portion continuing upward from the large diameter portion, and an intermediate diameter portion continuing upward from the small diameter portion, the small diameter portion and the intermediate diameter portion are slidably inserted into the lower portion of the operating member, distal end portions of the second supporting members project radially inward with respect to an inner peripheral surface of the operating member and are faced toward an outer peripheral surface of the small diameter portion of the piston on the lower side with respect to a lower surface of the intermediate diameter portion of the piston.

The piston may have two parts, namely, an upper part and a lower part, and may only have one part. In the case of having the upper and lower two parts, the upper piston corresponds to the above-described piston.

According to the fluid controller of the invention, by rotating the handle manually, the operating member moves upward and downward, so that the piston as a component of the automatic opening-and-closing device may be moved via the operating member. Therefore, the fluid controller capable of opening and closing both automatically and manually, and having a simplified configuration may be obtained.

DETAILED DESCRIPTION OF INVENTION

Embodiments of the invention will be described with reference to the drawings.

Figure 1:
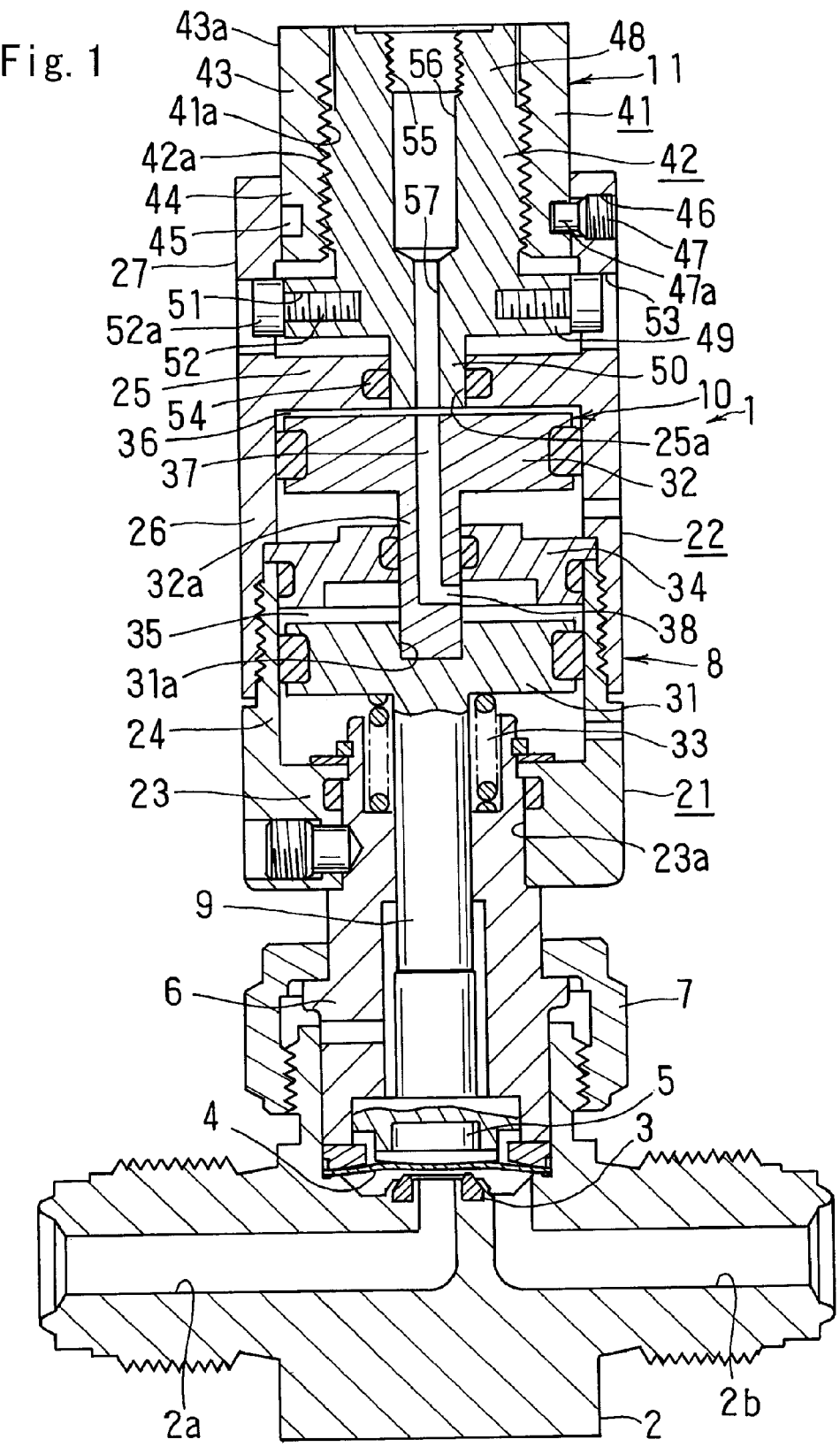
FIG. 1 is a vertical cross-sectional view of a fluid controller according to a first embodiment of the invention illustrating a passage-opened state in which a manual opening and closing operation is not performed.
Figure 2:
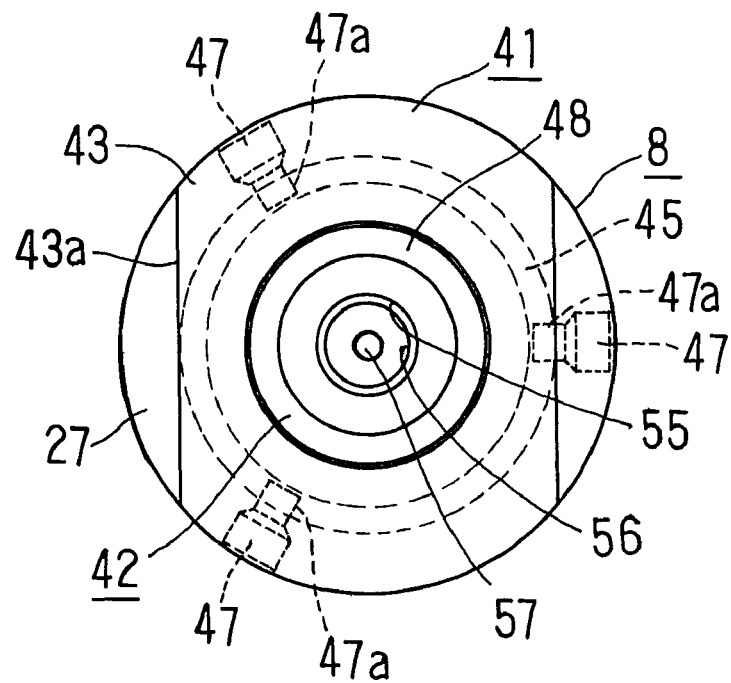
FIG. 2 is a plan view of FIG. 1.
Figure 5:
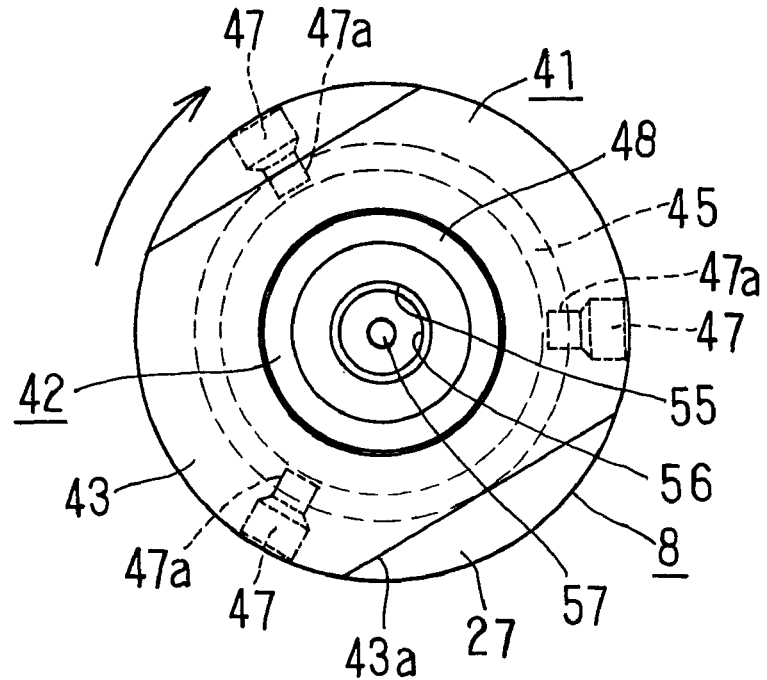
FIG. 5 is a plan view of FIG. 4.
Figure 3:
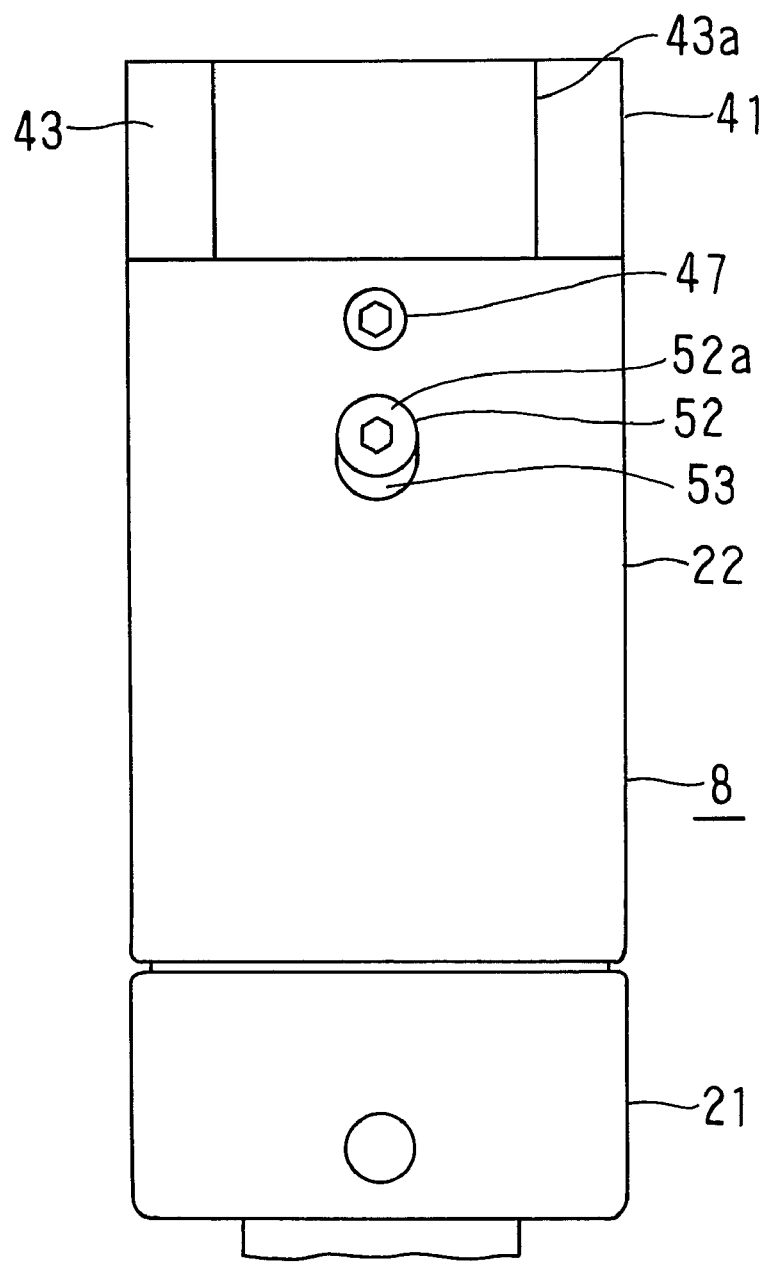
FIG. 3 is a right side view of FIG. 1 partly omitted.
Figure 4:
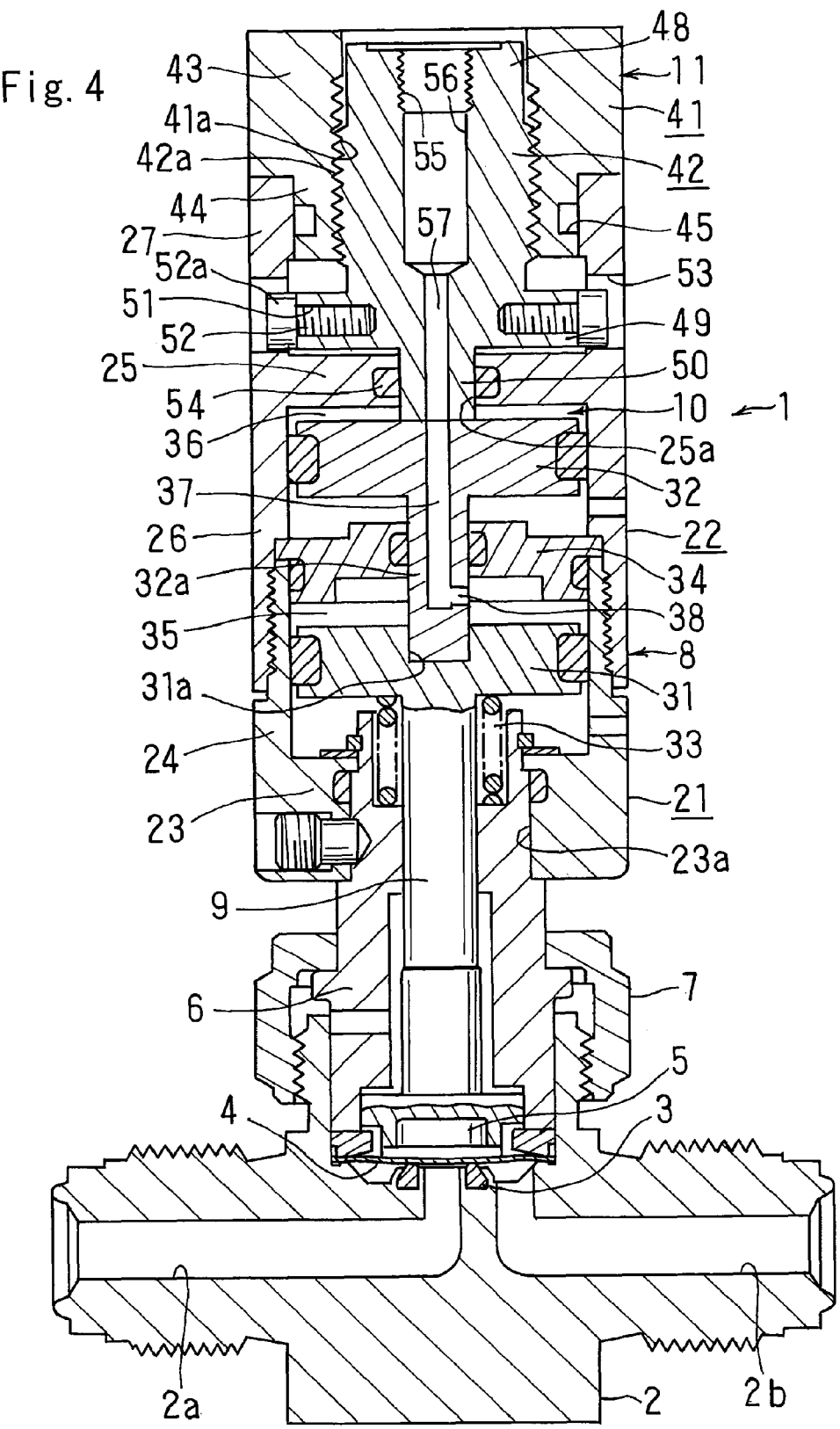
FIG. 4 is a vertical cross-sectional view of the fluid controller according to the first embodiment of the invention illustrating the passage-closed state obtained by the manual operation.

FIG. 1 to FIG. 5 illustrate a fluid controller according to a first embodiment of the invention. FIG. 1 to FIG. 3 illustrate a state in which an automatic opening-and-closing device is not operated (a fluid passage-opened state), and FIG. 4 and FIG. 5 illustrate a state in which the fluid passage is manually closed from the state illustrated in FIG. 1 and FIG. 2.

A fluid controller (1) of the first embodiment includes a valve box (2) having a fluid inlet passage (2a) and a fluid outlet passage (2b), an annular valve seat (3) provided on a peripheral edge of an upward-facing opening of the fluid inlet passage (2a), a diaphragm (valve element) (4) configured to open and close the fluid inlet passage (2a) by being pressed against (moved in a closing direction) or moved away from (moved in an opening direction) the annular valve seat (3), a valve element holder (5) movable upward and downward and configured to hold the diaphragm (4), a cylindrical bonnet (6) inserted at a lower end portion thereof into a depressed portion formed in the valve box (2) and extending upward, a hexagon cap nut (7) configured to fix the bonnet (6) to the valve box (2), a cylindrical casing (8) fixed at a lower end portion thereof to an upper end portion of the bonnet (6), a valve rod (9) provided with the valve element holder (5) mounted on a lower end portion thereof and inserted into the bonnet (6) so as to be movable upward and downward, an automatic opening-and-closing device (10) configured to move the valve rod (9) upward and downward by using a compressed air, and a manual opening-and-closing device (11) configured to move the valve rod (9) upward and downward by operating a manual handle (41).

The casing (8) includes a lower casing (21) and an upper casing (22). The lower casing (21) includes a bottom wall (23), and a peripheral wall (24) continuing upward from the bottom wall (23). The bottom wall (23) is provided with a through hole (23a) which allows insertion of an upper portion of the bonnet (6). The upper casing (22) includes a top wall (25), a peripheral wall (26) continuing downward from the top wall (25), and a cylindrical projecting portion (27) provided on an upper surface of the top wall (25). The top wall (25) is provided with a through hole (25a).

The automatic opening-and-closing device (10) includes a lower piston (31) formed integrally with an upper end portion of the valve rod (9), an upper piston (32) arranged above the lower piston (31) at a predetermined distance and moving upward and downward integrally with the valve rod (9), a compressed coil spring (biasing member) (33) configured to be received between the lower piston (31) and the upper end portion of the bonnet (6) and bias the valve rod (9) upward, and a counter plate (34) fixed to the casing (8) between the lower piston (31) and the upper piston (32).

The upper piston (32) includes a shaft portion (32a) extending downward from a lower surface thereof, and a lower end portion (distal end portion) of the shaft portion (32a) is fixedly fitted in a depressed portion (31a) provided on an upper surface of the lower piston (31).

A portion between the lower piston (31) and the counter plate (34) corresponds to a lower compressed fluid introducing chamber (35), and a portion between the upper piston (32) and the top wall (25) of the upper casing (22) corresponds to an upper compressed fluid introducing chamber (36). The upper piston (32) is provided with an axial passage (37) extending downward from an upper surface thereof, and a radial passage (38) extending radially from a lower end portion of the axial passage (37) and communicating with the lower compressed fluid introducing chamber (35).

According to the automatic opening-and-closing device (10), since the compressed coil spring (33) biases the valve rod (9) upward, a fluid-passage-opened state illustrated in FIG. 1 is achieved, and a compressed fluid is introduced into the lower compressed fluid introducing chamber (35) and the upper compressed fluid introducing chamber (36), so that the valve rod (9) moves downward and a fluid-passage-closed state is achieved (not illustrated).

The manual opening-and-closing device (11) includes the cylindrical handle (41) and a cylindrical operating member (42) arranged in the handle (41).

A female screw (41a) is formed on an inner periphery of the handle (41), and a male screw (42a) is formed on an outer periphery of the operating member (42), and the handle (41) and the operating member (42) are screwed each other.

The handle (41) includes a large diameter portion (43), and a small diameter portion (44) continuing downward from the large diameter portion (43) and having the same inner diameter as that of the large diameter portion (43) and a smaller outer diameter than that of the large diameter portion (43). The large diameter portion (43) is provided with an operating portion (43a) having two parallel surfaces formed by being cut at both sides thereof.

The small diameter portion (44) of the handle (41) is fitted into the cylindrical projecting portion (27) of the upper casing (22).

The small diameter portion (44) of the handle (41) is provided with an annular groove (45) on an outer periphery thereof, and the cylindrical projecting portion (27) of the upper casing (22) is provided with three radially extending screw holes (46) facing toward the annular groove (45) equidistantly in a circumferential direction. A male screw (first supporting member) (47) is fixedly screwed into the screw holes (46). A distal end portion (47a) of the male screw (47) has an outer diameter smaller than that of a portion where the male screw (47) is formed, and the distal end portion (47a) of the male screw (47) is inserted into the annular groove (45). The diameter of a distal end portion of the male screw (47) and the height (a dimension in a vertical direction) of the annular groove (45) are substantially the same, whereby the handle (41) is capable of rotating and restricted from moving upward and downward with respect to the upper casing (22).

The operating member (42) includes an intermediate diameter portion (48) provided with the male screw (42a), a large diameter portion (49) continuing from a lower end of the intermediate diameter portion (48) and having an outer diameter larger than that of the intermediate diameter portion (48), and a small diameter portion (50) continuing from the lower end of the large diameter portion (49) and having an outer diameter smaller than that of the intermediate diameter portion (48).

The large diameter portion (49) of the operating member (42) is provided with screw holes (51) extending radially inward from an outer peripheral surface at a plurality of positions (2 to 4 positions) equidistantly in the circumferential direction, and hexagon socket head cap screws (second supporting members) (52) are fixedly screwed into the respective screw holes (51). The upper casing (22) is provided with through holes (53) for accommodating head portions (52a) of the hexagon socket head cap screws (52). The through hole (53) has a width substantially equal to the diameter of the head portion (52a) of the hexagon socket head cap screw (52), and is an elongated hole elongated in the vertical direction as illustrated in FIG. 3. In a state illustrated in FIG. 1 and FIG. 3, the head portions (52a) of the hexagon socket head cap screws (52) are at upper end portions of the through holes (53) and cannot move upward any more, but may be moved downward by being guided by the through holes (53).

In this manner, the head portions (radially outside end portions) (52a) of the hexagon socket head cap screws (second supporting members) (52) are inserted into the through holes (53) elongated in the vertical direction provided on the upper casing (22), so that the operating member (42) is supported by the upper casing (22) so as to be restricted from rotating and movable upward and downward.

The small diameter portion (50) of the operating member (42) is slidably inserted into the through hole (25a) provided on the top wall (25) of the upper casing (22). An O-ring (54) configured to seal between the small diameter portion (50) and the through hole (25a) is provided at an edge portion of the through hole (25a).

Since the handle (41) is rotatable but is restricted from moving upward and downward with respect to the upper casing (22), if the handle (41) is rotated, the operating member (42) is restricted from rotating with respect to the upper casing (22), and hence moves upward and downward. The female screw (41a) of the handle (41) and the male screw (42a) of the operating member (42) are general right screws, and if the handle (41) is rotated counterclockwise, the operating member (42) moves downward and the passage is closed. The female screw (41a) of the handle (41) and the male screw (42a) of the operating member (42) may be configured to be left screws so that the passage is closed by rotating the handle (41) clockwise.

A rotatable angle of the handle (41) is approximately 240°. The operating portion (43a) having the two parallel surfaces is provided on the handle (41), so that the shape of the handle (41) is also different between FIG. 1 and FIG. 4, and is different between FIG. 2 and FIG. 5. Whether the passage is forcedly closed by the manual opening-andclosing device (11) or not may be known depending on the direction that the two parallel surfaces of the operating portion (43a) face.

A female screw portion (55) to which a compressed fluid introducing pipe line is connected is provided at an upper end portion in an inner periphery of the operating member (42). The inner periphery of the operating member (42) includes a large diameter portion (56) continuing from the female screw portion (55) and a small diameter portion (57) continuing from the large diameter portion (56), and is configured to be a compressed fluid passage penetrating through the operating member (42) in an axial direction.

In the state illustrated in FIG. 1, the compressed coil spring (33) biases the valve rod (9) upward, so that the passage-opened state is obtained.

At the time of automatic opening and closing operation, the compressed fluid introduced from the upper end portion of the inner periphery of the operating member (42) flows downward on the inner periphery of the operating member (42) and is supplied to the upper compressed fluid introducing chamber (36) above the upper piston (32), and then is supplied to the lower compressed fluid introducing chamber (35) through the axial passage (37) and the radial passage (38) of the upper piston (32). Accordingly, the valve rod (9) moves downward, and the passage-closed state by the automatic opening-and-closing device (10) is obtained.

In the state illustrated in FIG. 1, if the passage needs to be closed manually, an operator rotates the handle (41) counterclockwise. With this operation, the operating member (42) moves downward and a lower end surface thereof comes into contact with the upper surface of the upper piston (32) first, and then presses the upper piston (32) and moves downward integrally therewith. In this manner, the upper piston (32) and the lower piston (31) are moved in an opposite direction (closing direction in this case) from the normal opened or closed state (opened state in this case) obtained by the automatic opening-and-closing device (10) by the manual opening-and-closing device (11) (by the operating member (42) moving upward and downward in association with the rotating operation of the handle (41)).

In the description given above, the configuration of a part lower than the upper piston (32) (that is, the configuration of an automatic valve) is not limited to those illustrated, and may be replaced by the configuration of known various automatic valves.

Figure 6:
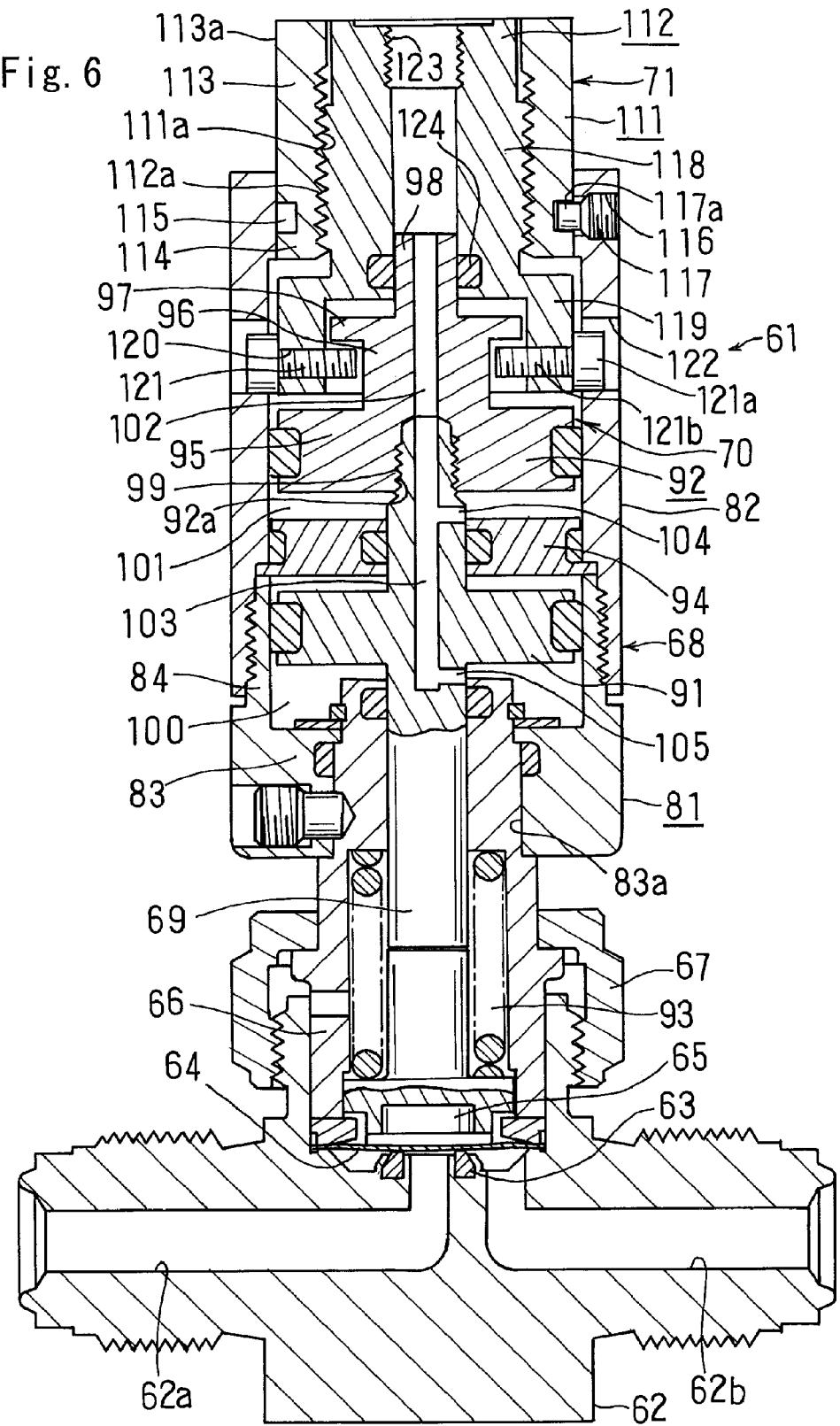
FIG. 6 is a vertical cross-sectional view of a fluid controller according to a second embodiment of the invention illustrating a passage-closed state in which a manual opening and closing operation is not performed.
Figure 7:
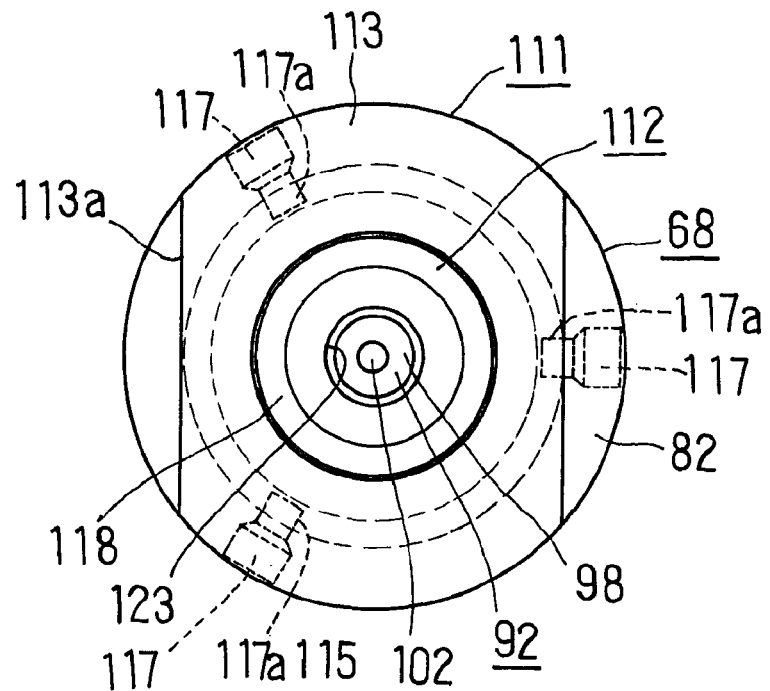
FIG. 7 is a plan view of FIG. 6.
Figure 10:
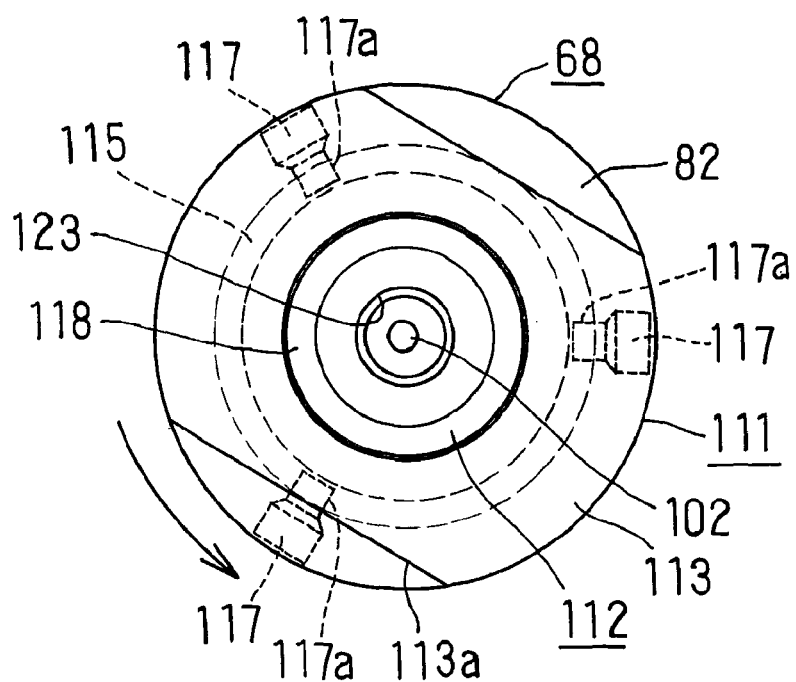
FIG. 10 is a plan view of FIG. 9.
Figure 8:
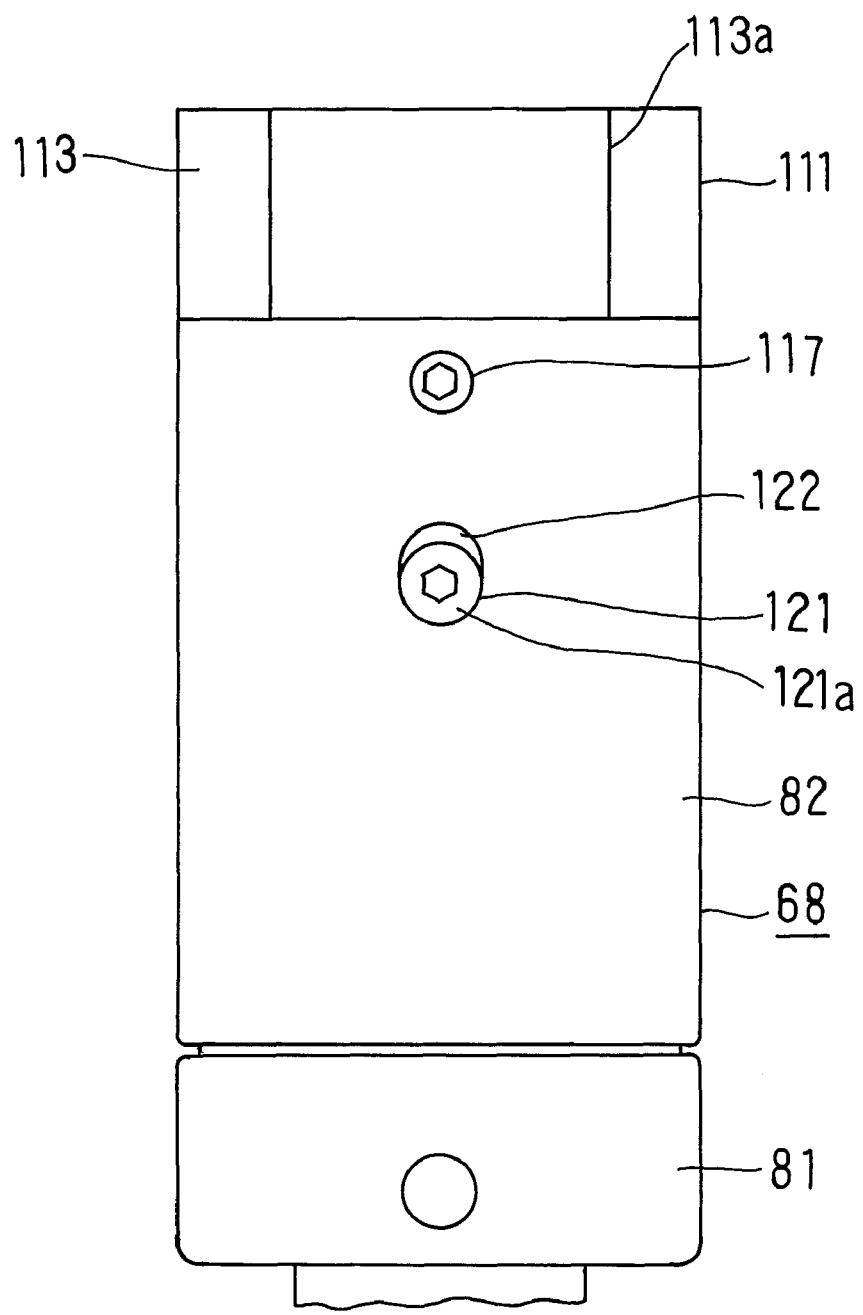
FIG. 8 is a right side view of FIG. 6 partly omitted.
Figure 9:
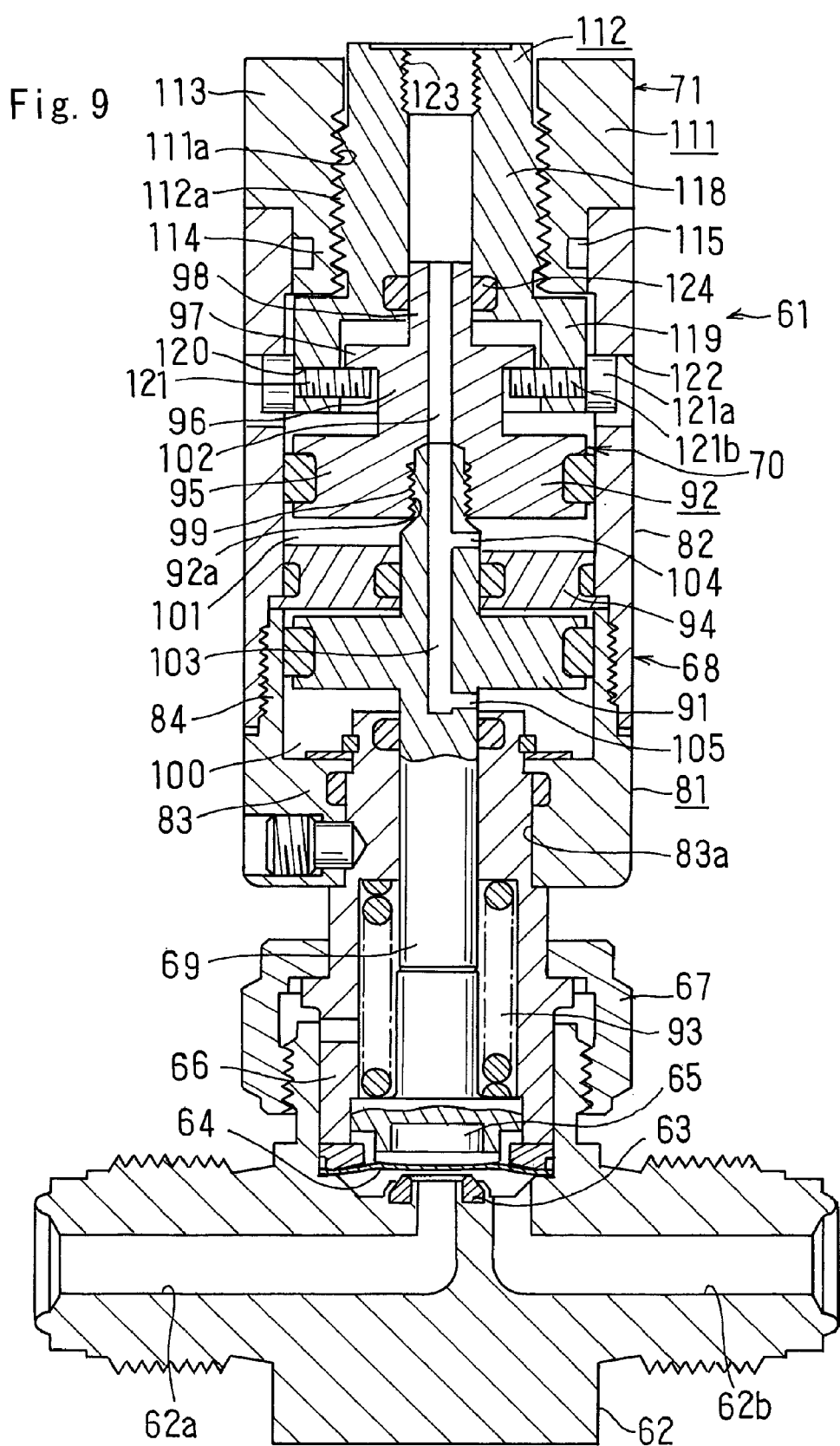
FIG. 9 is a vertical cross-sectional view of a fluid controller according to the second embodiment of the invention illustrating a passage-opened state obtained by the manual operation.

FIG. 6 to FIG. 10 illustrate a fluid controller according to a second embodiment of the invention. FIG. 6 to FIG. 8 illustrate a state in which the automatic opening-and-closing device is not operated (fluid passage-closed state), and FIG. 9 and FIG. 10 illustrate a state in which the fluid passage is manually opened from the state illustrated in FIG. 6 and FIG. 7.

A fluid controller (61) of the second embodiment includes a valve box (62) having a fluid inlet passage (62a) and a fluid outlet passage (62b), an annular valve seat (63) provided on a peripheral edge of an upward-facing opening of the fluid inlet passage (62a), a diaphragm (valve element) (64) configured to open and close the fluid inlet passage (62a) by being pressed against (moved in the closing direction) or moved away from (moved in the opening direction) the annular valve seat (63), a valve element holder (65) movable upward and downward and configured to hold the diaphragm (64), a cylindrical bonnet (66) inserted at a lower end portion thereof into a depressed portion formed in the valve box (62) and extending upward, a hexagon cap nut (67) configured to fix the bonnet (66) to the valve box (62), a cylindrical casing (68) fixed at a lower end portion thereof to an upper end portion of the bonnet (66), a valve rod (69) provided with the valve element holder (65) mounted on a lower end portion thereof and inserted into the bonnet (66) so as to be movable upward and downward, an automatic opening-and-closing device (70) configured to move the valve rod (69) upward and downward by using a compressed air, and a manual opening-and-closing device (71) configured to move the valve rod (69) upward and downward by operating a manual handle (111).

The casing (68) includes a lower casing (81) and an upper casing (82). The lower casing (81) includes a bottom wall (83), and a peripheral wall (84) continuing upward from the bottom wall (83). The bottom wall (83) is provided with a through hole (83a) which allows insertion of an upper portion of the bonnet (66).

The automatic opening-and-closing device (70) includes a lower piston (91) formed integrally with an upper end portion of the valve rod (69), an upper piston (92) fixed to the upper end portion of the valve rod (69) so as to project upward, a compressed coil spring (biasing member) (93) configured to be received between a flange provided on the lower end portion of the valve rod (69) and a shouldered portion provided on the upper portion of the bonnet (66) and bias the valve rod (69) downward, and a counter plate (94) fixed to the casing (68) between the lower piston (91) and the upper piston (92).

The upper piston (92) includes a large diameter portion (95) configured to slide in the upper casing (82) along an inner periphery thereof, a small diameter portion (96) continuing upward from the large diameter portion (95), an intermediate diameter portion (97) continuing upward from the small diameter portion (96), and an upper projecting portion (98) extending upward from a center portion of an upper surface of the intermediate diameter portion (97).

A portion of the valve rod (69) extending upward from an upper surface of the lower piston (91) slidably penetrates through the counter plate (94), and a male screw portion (99) provided at the upper end portion thereof is fixedly screwed into a screw hole (92a) provided on a lower surface of the upper piston (92).

A portion between the lower piston (91) and the bottom wall (83) of the lower casing (81) corresponds to a lower compressed fluid introducing chamber (100), and a portion between the upper piston (92) and the counter plate (94) corresponds to an upper compressed fluid introducing chamber (101).

The upper piston (92) is provided with an axial passage (102) extending downward from an upper surface thereof, and the valve rod (69) is provided with an axial passage (103) extending downward so as to continue from a lower end of the axial passage (102) of the upper piston (92) to a position on the lower side of an lower surface of the lower piston (91), a first radial passage (104) extending radially from the axial passage (103) and communicating with the upper compressed fluid introducing chamber (101), and a second radial passage (105) extending radially from the axial passage (103) and communicating with the lower compressed fluid introducing chamber (100).

According to the automatic opening-and-closing device (70), since the compressed coil spring (93) biases the valve rod (69) downward, a fluid-passage-closed state illustrated in FIG. 6 is achieved in a normal state, and a compressed fluid is introduced into the lower compressed fluid introducing chamber (100) and the upper compressed fluid introducing chamber (101), so that the valve rod (69) moves upward and a fluid-passage-opened state is achieved (not illustrated).

The manual opening-and-closing device (71) includes a cylindrical handle (111), and a cylindrical operating member (112) arranged in the handle (111).

A female screw (111a) is formed on an inner periphery of the handle (111), and a male screw (112a) is formed on an outer periphery of the operating member (112), and the handle (111) and the operating member (112) are screwed to each other.

The handle (111) includes a large diameter portion (113), and a small diameter portion (114) continuing downward from the large diameter portion (113) and having the same inner diameter as that of the large diameter portion (113) and a smaller outer diameter than that of the large diameter portion (113). The large diameter portion (113) is provided with an operating portion (113a) having two parallel surfaces formed by being cut at both sides.

The small diameter portion (114) of the handle (111) is fitted into an upper end portion of the upper casing (82).

The small diameter portion (114) of the handle (111) is provided with an annular groove (115) on an outer periphery thereof, and the upper end portion of the upper casing (82) is provided with three radially extending screw holes (116) facing toward the annular groove (115) equidistantly in the circumferential direction. A male screw (first supporting member) (117) is fixedly screwed into the screw holes (116). A distal end portion (117a) of the male screw (117) has an outer diameter smaller than that of a portion where the male screw (117) is formed, and the distal end portion (117a) of the male screw (117) is inserted into the annular groove (115). The diameter of a distal end portion of the male screw (117) and the height (a dimension in the vertical direction) of the annular groove (115) are substantially the same, whereby the handle (111) is capable of rotating and restricted from moving upward and downward with respect to the upper casing (82).

The operating member (112) includes a small diameter portion (118) provided with the male screw (112a) and a large diameter portion (119) continuing from a lower end of the small diameter portion (118) and having an outer diameter and an inner diameter larger than those of the small diameter portion (118).

The large diameter portion (119) of the operating member (112) is provided with screw holes (120) extending radially inward from an outer peripheral surface at a plurality of positions (2 to 4 positions) equidistantly in the circumferential direction, and hexagon socket head cap screws (second supporting members) (121) are fixedly screwed into the respective screw holes (120). The upper casing (82) is provided with through holes (122) for accommodating head portions (121a) of the hexagon socket head cap screws (121). The through hole (122) has a width substantially equal to the diameter of the head portion (121a) of the hexagon socket head cap screw (121), and is an elongated hole elongated in the vertical direction as illustrated in FIG. 8. In a state illustrated in FIG. 6 and FIG. 8, the head portions (121a) of the hexagon socket head cap screws (121) are at lower end portions of the through holes (122) and cannot move downward any more, but may be moved upward by being guided by the through holes (122).

In this manner, the head portions (radially outside end portions) (121a) of the hexagon socket head cap screws (second supporting members) (121) are inserted into the through holes (122) elongated in the vertical direction provided on the upper casing (82), so that the operating member (112) is supported by the upper casing (82) so as to be restricted from rotating and movable upward and downward.

The small diameter portion (96) and the intermediate diameter portion (97) of the upper piston (92) are slidably inserted into an inner peripheral surface of the large diameter portion (119) of the operating member (112).

A distal end portion (projecting portion) (121b) of the hexagon socket head cap screw (121) screwed in the screw hole (120) of the large diameter portion (119) of the operating member (112) projects radially inward with respect to the inner peripheral surface of the large diameter portion (119). The distal end portion (121b) of the hexagon socket head cap screw (121) faces toward an outer peripheral surface of the small diameter portion (96) of the upper piston (92) on the lower side of a lower surface of the intermediate diameter portion (97) of the upper piston (92).

The handle (111) is rotatable but is restricted from moving upward and downward with respect to the upper casing (82), and therefore, if the handle (111) is rotated, the operating member (112) is restricted from rotating with respect to the upper casing (82), and hence moves upward and downward. The female screw (111a) of the handle (111) and the male screw (112a) of the operating member (112) are general right screws, and if the handle (111) is rotated clockwise, the operating member (112) moves upward and the passage is opened. The female screw (111a) of the handle (111) and the male screw (112a) of the operating member (112) may be configured to be left screws so that the passage is opened by rotating the handle (111) counterclockwise.

A rotatable angle of the handle (111) is approximately 240°. The operating portion (113a) having the two parallel surfaces is provided on the handle (111), so that the shape of the handle (111) is also different between FIG. 6 and FIG. 9, and is different between FIG. 7 and FIG. 10. Whether the passage is forcedly closed by the manual opening-and-closing device (71) or not may be known depending on the direction that the two parallel surfaces of the operating portion (113a) face.

A female screw portion (123) to which a compressed fluid introducing pipe line is connected is provided at an upper end portion in an inner periphery of the operating member (112). The upper projecting portion (98) of the upper piston (92) is slidably inserted into a lower end portion of the inner periphery of the operating member (112). An O-ring (124) for sealing between the inner periphery of the operating member (112) and the upper projecting portion (98) of the upper piston (92) is provided on the inner periphery of the operating member (112).

In the state illustrated in FIG. 6, the compressed coil spring (93) biases the valve rod (69) downward, so that the passage-closed state is obtained.

At the time of automatic opening and closing operation, the compressed fluid introduced from an upper end portion of the inner periphery of the operating member (112) flows downward on the inner periphery of the operating member (112) and then passes through the axial passage (102) of the upper piston (92), reaches the axial passage (103) of the valve rod (69), and then is supplied from the first radial passage (104) and the second radial passage (105) to the upper compressed fluid introducing chamber (101) and the lower compressed fluid introducing chamber (100), respectively. Accordingly, the valve rod (69) moves upward, and the passage-opened state by the automatic opening-and-closing device (70) is obtained.

In the state illustrated in FIG. 6, if the passage needs to be opened manually, the operator rotates the handle (111) clockwise. With this operation, the operating member (112) moves upward, whereby the distal end portion (121b) of the hexagon socket head cap screw (121) comes into contact with, from the underside thereof, the lower surface of the intermediate diameter portion (97) of the upper piston (92) first, and then the upper piston (92) moves upward integrally with the operating member (112). In this manner, the upper piston (92) and the lower piston (91) are moved in an opposite direction (opening direction in this case) from the normal opened or closed state (closed state in this case) obtained by the automatic opening-and-closing device (70) by the manual opening-and-closing device (71) (by the operating member (112) moving upward and downward in association with the rotating operation of the handle (111)).

In the second embodiment described above, when the operating member (112) moves upward, the distal end portion (121b) of the hexagon socket head cap screw (121) fixed to the operating member (112) engages the intermediate diameter portion (97) of the upper piston (92), so that the hexagon socket head cap screw (121) which serves as a supporting member when moving the operating member (112) upward and downward also functions as a member for achieving engagement.

The configuration for the engagement is not limited to those described above as long as a projecting portion projecting radially inward (a portion corresponding to the distal end portion (121b) of the hexagon socket head cap screw (121)) is formed on an inner periphery of a lower portion of the operating member (112), and an engaging portion that engages a projecting portion of the operating member (112) when the operating member (112) moves upward (a portion corresponding to the intermediate diameter portion (97) of the upper piston (92)) is provided on the upper piston (92).

What is claimed is:

1. A fluid controller comprising:
    a valve box provided with a fluid passage;
    a valve element configured to open and close the fluid passage;
    a casing provided on an upper portion of the valve box;
    a valve rod configured to move the valve element in an opening or closing direction by moving upward or downward;
    an automatic opening-and-closing device having a piston configured to form a compressed fluid introducing chamber between the piston and the casing and configured to move the valve rod by a compressed fluid; and
    a manual opening-and-closing device configured to move the valve rod by a manual operation, wherein
    the manual opening-and-closing device includes:
        a cylindrical handle supported by the casing so as to be capable of rotating and restricted from moving upward and downward; and
        a cylindrical operating member screwed into a female screw provided on an inner periphery of the handle and configured to move upward and downward in association with a rotating operation of the handle, wherein
        the operating member is vertically offset from the piston of the automatic opening-and-closing device during automatic opening and closing operations, and the piston is moved by the operating member, which allows for manual upward and downward movement of the piston in association with the rotating operation of the handle during manual opening and closing operations in a direction opposite to a directional bias of the automatic opening-and-closing device at normal opening and closing configurations of the valve element,
    wherein a lower portion of the handle is fitted to an inner periphery of an upper end portion of the casing, an annular groove is formed on an outer periphery of a portion of the handle fitted to the casing, a plurality of first supporting members are mounted on the casing so as to face the annular groove from radially outside, and radially inner end portions of the first supporting members are inserted into the annular groove, so that the handle is supported by the casing so as to be rotatable and to be restricted from moving upward and downward, and
    second supporting members extending radially outward are mounted on the operating member, the casing is provided with through holes which allow insertion of the radially outside end portions of the second supporting members, and the through hole is an elongated hole elongated in the vertical direction, so that the operating member is supported by the casing so as to be restricted from rotating and to be movable upward and downward.

2. The fluid controller according to claim 1, wherein a compressed fluid introducing chamber is formed above the piston, an inner periphery of the operating member at least partially defines a compressed fluid passage, and a lower end of the operating member is positioned above an upper surface of the piston at the time of automatic opening and closing operation.

3. The fluid controller according to claim 1, wherein the compressed fluid introducing chamber is formed below the piston, an inner periphery of the operating member at least partially defines the compressed fluid passage, an upper part of the piston is slidably inserted into a lower portion of the operating member, a projecting portion projecting radially inward is formed on an inner periphery of the lower portion of the operating member, and the piston is provided with an engaging portion which engages the projecting portions of the operating member when the operating member moves upward.

4. The fluid controller according to claim 1, wherein the piston comprises:
    a large diameter portion configured to slide along an inner periphery of the casing;
    a small diameter portion continuing upward from the large diameter portion; and
    an intermediate diameter portion continuing upward from the small diameter portion, and wherein
    the small diameter portion and the intermediate diameter portion are slidably inserted into the lower portion of the operating member, distal end portions of the second supporting members project radially inward with respect to an inner peripheral surface of the operating member and are faced toward an outer peripheral surface of the small diameter portion of the piston on the lower side with respect to a lower surface of the intermediate diameter portion of the piston.

* * * * *